(12) United States Patent
Hou et al.

(10) Patent No.: US 10,176,325 B1
(45) Date of Patent: Jan. 8, 2019

(54) SYSTEM AND METHOD FOR DYNAMIC DETECTION OF COMMAND AND CONTROL MALWARE

(71) Applicant: Symantec Corporation, Mountain View, CA (US)

(72) Inventors: Zhengqing Hou, Mountain View, CA (US); Oksoon Jeong, Mountain View, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 183 days.

(21) Appl. No.: 15/188,415

(22) Filed: Jun. 21, 2016

(51) Int. Cl.
| | |
|---|---|
| *G06F 21/56* | (2013.01) |
| *G06F 21/53* | (2013.01) |
| *G06F 21/57* | (2013.01) |
| *H04L 29/06* | (2006.01) |

(52) U.S. Cl.
CPC ......... *G06F 21/566* (2013.01); *G06F 21/53* (2013.01); *G06F 21/56* (2013.01); *G06F 21/561* (2013.01); *G06F 21/563* (2013.01); *G06F 21/577* (2013.01); *H04L 63/1433* (2013.01); *H04L 63/1441* (2013.01)

(58) Field of Classification Search
CPC ...... G06F 21/577; G06F 21/566; G06F 21/53; G06F 21/561; G06F 21/56; G06F 21/563; H04L 63/1433; H04L 63/1441
See application file for complete search history.

(56) References Cited

U.S. PATENT DOCUMENTS

| | | | | |
|---|---|---|---|---|
| 9,245,114 | B2 * | 1/2016 | Thomas | G06F 21/55 |
| 9,325,735 | B1 * | 4/2016 | Xie | H04L 63/145 |
| 9,542,556 | B2 * | 1/2017 | Sanders | G06F 21/566 |
| 9,560,072 | B1 * | 1/2017 | Xu | H04L 63/1416 |
| 9,690,936 | B1 * | 6/2017 | Malik | G06F 21/562 |
| 9,716,727 | B1 * | 7/2017 | Seger | H04L 63/1491 |
| 9,762,596 | B2 * | 9/2017 | Wang | H04L 63/1416 |

(Continued)

OTHER PUBLICATIONS

A. Wichmann and E. Gerhards-Padilla, "Using Infection Markers as a Vaccine against Malware Attacks," 2012 IEEE International Conference on Green Computing and Communications, Besancon, 2012, pp. 737-742. (Year: 2012).*

(Continued)

*Primary Examiner* — Kari L Schmidt
(74) *Attorney, Agent, or Firm* — Maschoff Brennan (57) ABSTRACT

A system and method for dynamic detection of Command and Control (C&C) malware is provided. The method may include hooking API within an application and analyzing the code of the hooked API using static analysis. The method may further include conducting dynamic analysis; wherein incoming network and file content is collected and data patterns relating to C&C are detected from this content. Using these data patterns, this system may identify C&C URLs and further filter these URLs using C&C behaviors found during the dynamic analysis. For example, the system may detect when the code attempts to communicate with C&C servers or attempts to write to local files, which set up new C&C servers. Filtering of the C&C URLs may include detecting when the CRC URL intercepts an incoming SMS message or transmits a SMS; executes an abortBroadcast; or initiates collection of data leaked through to the network or the SMS.

20 Claims, 5 Drawing Sheets

(56) References Cited

U.S. PATENT DOCUMENTS

| | | | |
|---|---|---|---|
| 10,084,816 B2 * | 9/2018 | Zhang | H04L 63/1466 |
| 2010/0162350 A1 * | 6/2010 | Jeong | H04L 63/1416 726/1 |
| 2010/0333203 A1 * | 12/2010 | Tsviatkou | G06F 21/563 726/23 |
| 2013/0081129 A1 * | 3/2013 | Niemela | G06F 21/566 726/11 |
| 2013/0227683 A1 * | 8/2013 | Bettini | G06F 21/57 726/22 |
| 2013/0263270 A1 * | 10/2013 | Cote | G06F 21/52 726/24 |
| 2016/0065601 A1 * | 3/2016 | Gong | G06F 21/561 726/23 |
| 2016/0328742 A1 * | 11/2016 | Shiravi Khozani | G06Q 30/0248 |
| 2017/0026390 A1 * | 1/2017 | Sofka | H04L 63/1416 |
| 2017/0126715 A1 * | 5/2017 | Ikuse | H04L 63/1416 |
| 2017/0250997 A1 * | 8/2017 | Rostamabadi | H04L 63/1416 |
| 2017/0251002 A1 * | 8/2017 | Rostamabadi | H04L 63/1425 |
| 2017/0251003 A1 * | 8/2017 | Rostami-Hesarsorkh | H04L 63/1425 |
| 2017/0329962 A1 * | 11/2017 | Ikuse | G06F 21/53 |

OTHER PUBLICATIONS

Bilge, Leyla, et al. "Exposure: A passive dns analysis service to detect and report malicious domains." ACM Transactions on Information and System Security (TISSEC) 16.4 (2014): p. 14. (Year: 2014).*

Vidas, Timothy, et al. "A5: Automated analysis of adversarial android applications." Proceedings of the 4th ACM Workshop on Security and Privacy in Smartphones & Mobile Devices. pp. 39-50. ACM, 2014. (Year: 2014).*

* cited by examiner

SYSTEM AND METHOD FOR DYNAMIC DETECTION OF COMMAND AND CONTROL MALWARE

BACKGROUND

A Command and Control (C&C) infrastructure may include servers and various other network components, which may be used to control malware or networks established for annoying or malicious purposes (such as botnets). For example, botnets may be used to repetitively (robotically) send spam email or participate in distributed denial-of-service attacks; wherein, C&C servers issue commands controlling such activity. Malware operators may directly control these C&C servers or the servers may run on hardware compromised by malware. Designers of C&C infrastructure may implement the use of Fast-flux Domain Name System (DNS), which may be used by botnets to hide phishing and malware delivery sites behind an ever-changing network of compromised hosts acting as proxies. Thus, C&C servers are difficult to track down, because these may change from day to day. C&C servers may also hop from one DNS domain to another, where domain generating algorithms are used to create new DNS names for the C&C servers.

Conventionally, C&C related malware is detected by statically searching for some logic in source code associated with an application. For example, a system may detect whether the application includes code relating to the receipt of commands. Further, suspicious behaviour of leaking private information or sending premium texts may be identified. Since, however, numerous variations of malware related to C&C exist and these can proliferate rather quickly, the method that solely targets software can be insufficient to prevent numerous devices from being victimized within a short period of time. Alternatively, the use of static analysis may be used to identify C&C URLs. However, since most C&C malware continuously changes associated C&C URLs through the receipt of commands from C&C servers, the use of static analysis is an ineffective solution. It is within this context that the embodiments arise.

SUMMARY

Embodiments of a system and method for dynamic detection of C&C malware are provided. It should be appreciated that the present embodiment can be implemented in numerous ways, such as a process, an apparatus, a system, a device, or a method. Several inventive embodiments are described below.

In some embodiments, a system and method for dynamic detection of C&C malware is provided. The method may include hooking an Application Programming Interface (API) within an application and analyzing the code of the hooked API using static analysis. For example, when hooking the API, the method may include detecting an API associated with HTTP GET/POST, File I/O, private information collection, or outputting data; wherein, instructions are injected into the detected API that caused it to execute alternate code. Static analysis may include disassembling the code and detecting C&C malware from the disassembled code. Further, the method for dynamic detection of C&C malware may include conducting dynamic analysis; wherein, incoming network and file content is collected and data patterns relating to C&C are detected from this content. Dynamic analysis may comprise executing the code within a testing environment using a simulated sample and detecting C&C malware using a debugger, function call tracer, machine emulator, logic analyzer, or network sniffer. Using these detected data patterns, this system may identify C&C URLs and further filter these URLs using C&C behaviors found during the dynamic analysis. For example, in an effort to detect a C&C URL, the method may include detecting when the code attempts to communicate with C&C servers or attempts to write to local files, which set up new C&C servers. Further filtering of these C&C URLs may include detecting when the CRC URL intercepts an incoming Short Message Service (SMS) message or transmits a SMS through the network; executes an abortBroadcast; utilizes a text premium SMS; or initiates collection of data leaked through to the network or the SMS.

In some embodiments, a malware detection system is provided. The malware detection system may include a memory and a processor operable to hook an API within an application and analyze the code of the hooked API using static analysis. For example, when hooking the API, the system may detect an API associated with HTTP GET/POST, File I/O, private information collection, or outputting data. In response, the system may inject instructions into the detected API that caused it to execute alternate code. Static analysis may include disassembling the code and detecting C&C malware from the disassembled code. Further, the malware detection system may conduct dynamic analysis, whereby incoming network and file content is collected during the dynamic analysis. Dynamic analysis may comprise executing the code within a testing environment using a simulated sample and detecting C&C malware using a debugger, function call tracer, machine emulator, logic analyzer, or network sniffer. In response to identification of data patterns within the incoming network and file content, the detection system may identify C&C URLs using these identified data patterns. Additionally, the malware detection system may further filter the C&C URLs by detecting behavior associated with C&C found during the dynamic analysis. For example, in an effort to detect a C&C URL, the system may detect when the code attempts to communicate with C&C servers or attempts to write to local files, which set up new C&C servers. Further filtering of these C&C URLs may include detecting when the CRC URL intercepts an incoming SMS message or transmits a SMS through the network; executes an abortBroadcast; utilizes a text premium SMS; or initiates collection of data leaked through to the network or the SMS.

In some embodiments, a tangible, non-transitory, computer-readable media having instructions whereupon which, when executed by a processor, cause the processor to perform the C&C malware detection method described herein. The method may include hooking an API within an application and analyzing the code of the hooked API using static analysis. For example, when hooking the API, the method may include detecting an API associated with HTTP GET/POST, File I/O, private information collection, or outputting data; wherein, instructions are injected into the detected API that caused it to execute alternate code. Static analysis may include disassembling the code and detecting C&C malware from the disassembled code. Further, the method for dynamic detection of C&C malware may include conducting dynamic analysis; wherein, incoming network and file content is collected and data patterns relating to C&C are detected from this content. Dynamic analysis may comprise executing the code within a testing environment using a simulated sample and detecting C&C malware using a debugger, function call tracer, machine emulator, logic analyzer, or network sniffer. Using these detected data patterns, this system may identify C&C URLs and further filter these URLs using C&C behaviors found during the dynamic analysis. For example, in an effort to detect a C&C URL, the method may include detecting when the code attempts to communicate with C&C servers or attempts to write to local files, which set up new C&C servers. Further filtering of these C&C URLs may include detecting when the CRC URL intercepts an incoming SMS message or transmits a SMS through the network; executes an abort-Broadcast; utilizes a text premium SMS; or initiates collection of data leaked through to the network or the SMS.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one so skilled in the art without departing from the spirit and scope of the described embodiments.

DETAILED DESCRIPTION

The following embodiments describe a system and method for dynamic detection of C&C malware. It can be appreciated by one skilled in the art, that the embodiments may be practiced without some or all of these specific details. In other instances, well known process operations have not been described in detail in order not to unnecessarily obscure the embodiments.

The system may include a C&C malware detection agent including a processor configured to detect C&C malware. The system and method for dynamic detection of C&C malware may include hooking an application programming interface (API) within an application and analyzing the code of the hooked API using static analysis. For example, when hooking the API, the method may include detecting an API associated with HTTP GET/POST, File I/O, private information collection, or outputting data; wherein instructions are injected into the detected API that cause the API to execute alternate code. Static analysis may include disassembling the code and detecting C&C malware from the disassembled code. Further, the method for dynamic detection of C&C malware may include conducting dynamic analysis; wherein, incoming network and file content is collected and data patterns relating to C&C are detected from this content. Dynamic analysis may include executing the code within a testing environment using a simulated sample and detecting C&C malware using a debugger, function call tracer, machine emulator, logic analyzer, or network sniffer. Using these detected data patterns, this system may identify C&C URLs and further filter these URLs using C&C behaviors found during the dynamic analysis. For example, in an effort to detect a C&C URL, the method may include detecting when the code attempts to communicate with C&C servers or attempts to write to local files, which set up new C&C servers. Further, filtering of these C&C URLs may include detecting when the C&C URL intercepts an incoming SMS message or transmits a SMS through the network; executes an abortBroadcast; utilizes a text premium SMS; or initiates collection of data leaked through to the network or the SMS.

In this way, the system may destroy or subvert malware C&C networks, by seizing servers or cutting them off from the Internet. For example, the system can deny access to domains that were due to be used if the identified malware where to contact the associated C&C infrastructure. Further, the system may be used to break into the C&C network itself.

Since C&C servers and associated malware are increasingly emerging from the personal computing (PC) side to the mobile device side, the use of this system and method can eliminate network damage and enhance network performance. Since C&C malware is likely to communicate with C&C servers to retrieve commands or configurations (which can be written in local preference files), dynamically analyzing the network and file contents in an effort to identify C&C servers is a useful solution for any mobile device, including, for example, an Android® Mobile device. The embodiments define patterns by dynamically analyzing a small number of malware Android® package files (apks) so that a large amount of C&C URLs can be detected. Thus, one identified C&C URL can prevent thousands of malware apks. By combining C&C related behaviors detected using dynamic analysis, the C&C URLs can be further refined and ensured to be reliable.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "providing," "generating," "installing," "monitoring," "enforcing," "receiving," "logging," "intercepting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment Like reference numbers signify like elements throughout the description of the figures.

Figure 1:
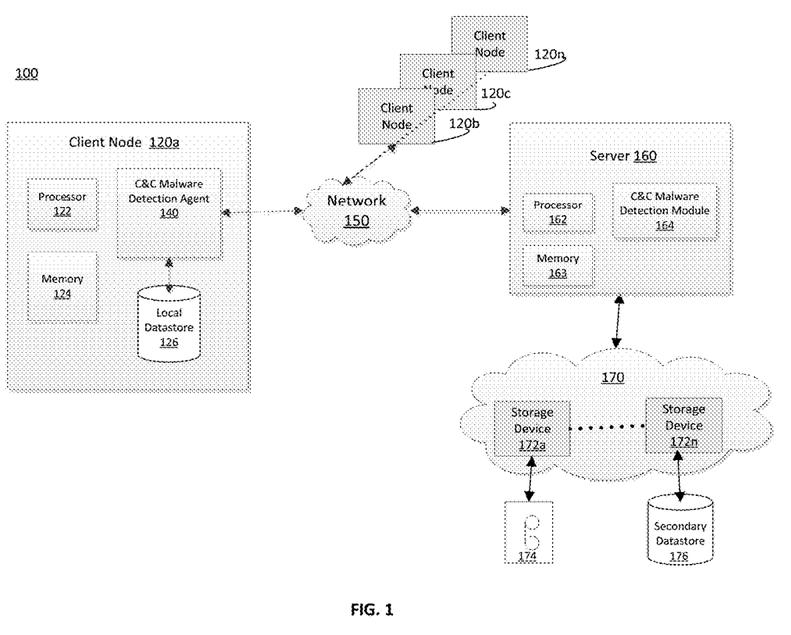
FIG. 1 is a system diagram of an antivirus networked computing system having multiple client nodes coupled to a server to provide dynamic C&C malware detection and protection, in accordance with some embodiments.

Referring to FIG. 1, a system diagram of an antivirus networked computing system with multiple client nodes coupled to a server to provide networked C&C malware detection and protection, in accordance with some embodiments is shown. The system includes at least one client node 120a-n, a network 150, at least one antivirus protection server 160, and a plurality of secondary storage devices 172, 174, and 176. Computing devices nodes 120a-n, with local data store 126, are coupled by a network 150 to the antivirus protection server 160 having its own C&C malware detection module 164 and remote storage device 172a-n. Each client node 120a-n may include a C&C malware detection agent 140, memory 124, a processor 122, and local data store 126. Examples of the client nodes 120a-n may include, but are not limited to, personal computers, laptops, PDAs, mobile phones, network appliances, and the like. In some embodiments, the C&C malware detection agent 140 may serve as a device that communicates with the antivirus protection server 160 to perform the method of dynamic C&C malware detection described more in detail below. In other embodiments, the C&C malware detection module 164 within the antivirus protection server 160 may communicate with each client node 120a-n and serve as the sole agent that performs the method of C&C malware detection described herein. The client nodes 120a-n, antivirus protection server 160, and the storage devices 172a-n may reside on the same LAN, or on different LANs that may be coupled together through the Internet, but separated by firewalls, routers, and/or other network devices. In one embodiment, client nodes 120a-n may couple to network 150 through a mobile communication network. In another embodiment, the client nodes 120a-n, antivirus protection server 160, and the storage devices 172a-n may reside on different networks. In some embodiments, the antivirus protection server 160 may reside in a cloud network. Although not shown, in various embodiments, the client node 120a-n may be notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), set-top boxes, cameras, integrated devices combining at least two of the preceding devices, and the like The antivirus protection server 160 may include a processor 162, memory 163, and C&C malware detection module 164. The C&C malware detection module 164 may include processing software instructions and/or hardware logic required for C&C malware detection according to the embodiments described herein. The antivirus protection server 160 may provide remote cloud storage capabilities for detected patterns associated with C&C malware, C&C URLs, detected C&C malware, and various types of behaviors or policies associated with C&C malware, through the storage devices 172a-n coupled by network 170. Further, these may couple to one or more tape-out devices 174 or any other secondary datastore 176. The antivirus protection server 160 may also comprise a local data storage unit (not shown), which can be one or more centralized data repositories having mappings of respective associations between each fragment data and its location within a remote storage devices 172a-n. The local data store may represent a single or multiple data structures (databases, repositories, files, etc.) residing on one or more mass storage devices, such as magnetic or optical storage based disks, tapes or hard drives. This local data store may be an internal component of the antivirus protection server 160. The local data store also may couple externally to antivirus protection server 160, or remotely through a network. The antivirus protection server 160 can communicate with the remote storage devices 172a-n over a public or private network. Although not shown, in various embodiments, the antivirus protection server 160 may be a notebook computer, desktop computer, microprocessor-based or programmable consumer electronics, network appliance, mobile telephone, smart telephone, radio frequency (RF) device, infrared (IR) device, Personal Digital Assistant (PDA), set-top box, an integrated device combining at least two of the preceding devices, and the like The system may include remote data storage units and tape-out devices coupled by a network to client nodes 120a-n. As such, a database of C&C behavior and/or policies may be stored within the local data store (126), remote disks 172a-n, secondary data store 176, or tape-outs devices 174. The database may include detected patterns, previously detected malware, and C&C URLs. In some embodiments, the client node 120a may retrieve previous results relating to an application initially from a remote datastore to a local data store 126. In other embodiments, the database of C&C malware behavioral characteristics may be stored locally on the client node 120a-n or the backup server 160.

In operation, the C&C malware detection agent 140 may include a memory and a processor used to hook API; wherein, agent 140 analyzes the code of the hooked API using statistical analysis. For example, when hooking the API, the agent 140 may detect an API associated with HTTP GET/POST, File I/O, private information collection, or outputting data. Further, agent 140 may inject instructions into the detected API, causing the API to execute alternate code. Static analysis may be performed by agent 140, including disassembling the code and detecting C&C malware from the disassembled code. Further, C&C malware detection agent 140 may conduct dynamic analysis; wherein, agent 140 collects incoming network and file content and detects data patterns relating to C&C malware from this content. Dynamic analysis may include executing the code within a testing environment using a simulated sample and detecting C&C malware using a debugger, function call tracer, machine emulator, logic analyzer, or network sniffer. Using these detected data patterns, C&C malware detection agent 140 may identify C&C URLs and further filter these URLs using C&C behaviors found during the dynamic analysis. For example, in an effort to detect a C&C URL, agent 140 may detect when the code attempts to communicate with C&C servers or attempts to write to local files, which set up new C&C servers. Further, filtering of these C&C URLs may include detecting when the C&C URL intercepts an incoming SMS message or transmits a SMS through the network. Additionally, agent 140 may detect when the C&C URL executes an abortBroadcast, utilizes a text premium SMS, or initiates collection of data leaked through to the network or the SMS.

It is appreciated that the components of exemplary operating environment 100 are exemplary and more or fewer components may be present in various configurations. It is further appreciated that operating environment may be part of a distributed computing environment, a cloud computing environment, a client server environment, and the like. In other words, as would be apparent to one of ordinary skill in the art after reading this description, the various features and functionality described herein may be implemented in the antivirus system using any arrangement components necessary to perform the dynamic C&C malware detection and other malware detection (and functionality); and can be implemented in one or more separate or shared modules in various combinations and permutations.

Figure 2:
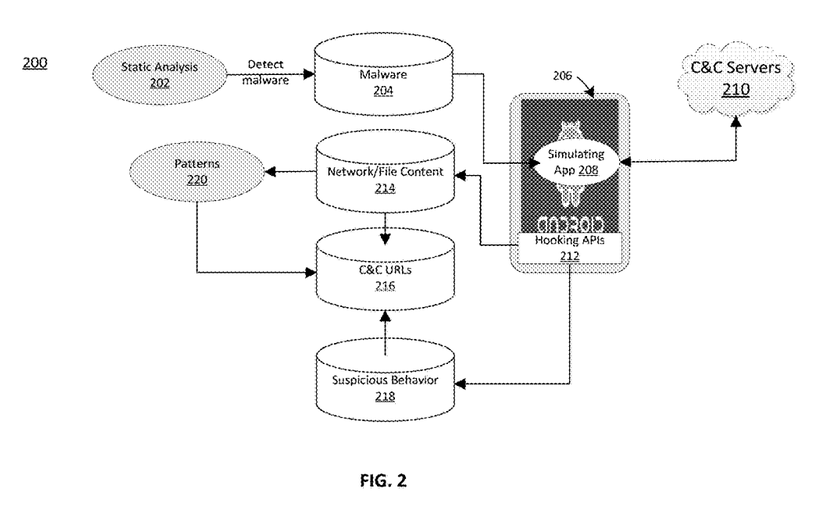
FIG. 2 is an overview of an example implementation of detecting C&C malware in accordance with some embodiments.

FIG. 2 is an overview of an example implementation of detecting C&C malware in accordance with some embodiments. The antivirus system 200 provided in one example implementation may include statistic analysis 202 performed to detect malware, wherein the malware may be stored in a database 204. A mobile computing device 206 may be used to simulate the application 208, identifying C&C behavior patterns associated with C&C servers 210 and communication therebetween. The dynamic C&C malware detection agent may reside on the mobile device 206, where the agent hooks the APIs 212 and monitors network and file content 214, which may be stored in a database. Although C&C URLs continuously change and variations of C&C malware continues to increase, data in the communication between C&C servers and associated malware is likely to have formats and patterns in common. Accordingly, the system may detect patterns 220 with in the network and file contents 214. Once useful patterns through network traffic or file contents are found, more candidates of C&C URLs can be detected accordingly. In response to the detected patterns 220, the system may detect associated C&C URLs 216. Further, in an attempt to filter the designated C&C URLs, the system may monitor any suspicious behavior 218 that may be interpreted to be characteristic of C&C malware. By combining the detection of suspicious behavior relevant to C&C, these C&C URLs can be further refined. This filtering will further ensure the reliability of the detected C&C malware.

Figure 3:
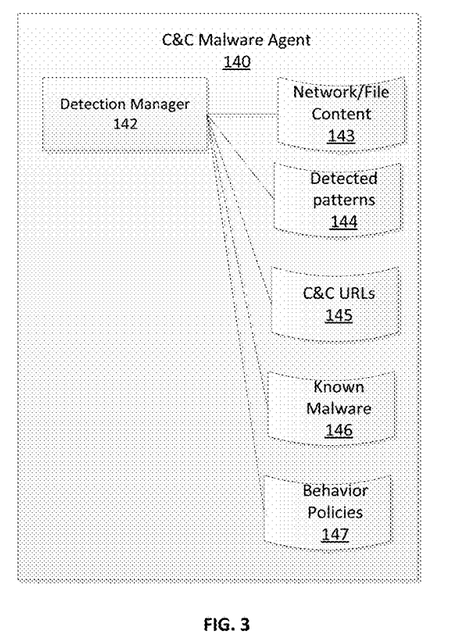
FIG. 3 is a block diagram showing the contents of a C&C malware agent of FIG. 1 as an antivirus utility in some embodiments.

FIG. 3 is a block diagram showing the contents of a C&C malware agent of FIG. 1 as an antivirus utility in some embodiments. An exemplary embodiment of the C&C malware detection agent 140 is shown. Agent 140 may include a detection manager 142 in cooperation with four differing databases, including one for network and file content 143, detected patterns 144, detected C&C URLs 145, known malware 146, and behavior policies 147. In operation, the detection manager 142 may perform the functions of static analysis and dynamic analysis. For example, the detection manager 142 may identify C&C malware using previous static analysis history by accessing a database containing previously detected patterns 144 and C&C URLs 145. The detection manager 142 may collect incoming network contents and file contents during dynamic simulation. The collected content may be stored in the database holding previously detected network and file contents 143. Additionally, the detection manager 142 may analyze the incoming content for data patterns, such as commands from C&C servers or commands that set in change C&C URLs. Further, the detection manager 142 may identify additional C&C URLs using the detected data patterns; wherein, manager 142 may determine when the code tries to communicate with C&C servers or initiates write within local files to set up new C&C servers. Through a combination of the C&C behaviors found using dynamic analysis, the detection manager 142 may refine the list of C&C URLs in an effort to ensure the reliability regarding the detection of C&C malware. Further, the detection manager 142 may search the database of known malware 146 or use characteristic behaviors associated with C&C malware or policies defined to respond to these 147 in an effort to detect C&C malware. It should be appreciated that the C&C malware module 164 FIG. 1 may include similar components to those of C&C malware detection agent 140.

The term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Figure 4A:
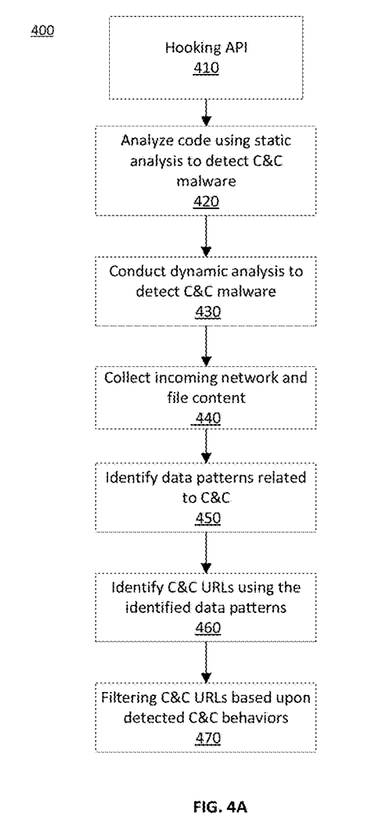
FIG. 4A is a flow diagram of a method for dynamically detecting C&C malware in accordance with some embodiments.
Figure 4B:
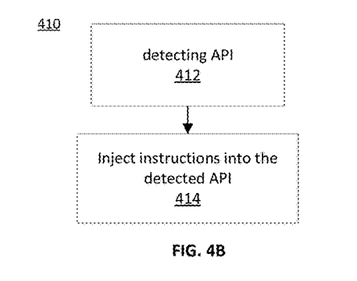
FIG. 4B is a flow diagram of a method for hooking API of FIG. 4A, in accordance with some embodiments.
Figure 4C:
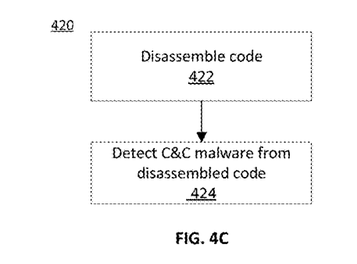
FIG. 4C is a flow diagram of a method for providing the static analysis of FIG. 4A, in accordance with some embodiments.

FIG. 4A is a flow diagram of a method for dynamically detecting C&C malware in accordance with some embodiments. In an action 410, the method may include hooking an API within an application. For example, as shown in FIG. 4B, the method for hooking API of FIG. 4A in accordance with some embodiments may include detecting the API in an action 412 and injecting instructions into the detected API in an action 414. HTTP GET/POST and File I/O APIs may be use to collect network contents and file contents. The types of APIs hooked may include APIs which collect private information like phone number, device id, IMEI, SMS message and the like. Further, APIs that send data out of the Android® mobile device using HTTP GET/POST or SMS may also be hooked. Further, in some embodiments, the hooked API may be analyzed using static analysis to detect C&C malware in action 420. For example, as shown in FIG. 4C, the method for providing the static analysis of FIG. 4A in accordance with some embodiments may include disassembling the code an action 422 and detecting C&C malware from the disassembled code an action 424.

Figure 4D:
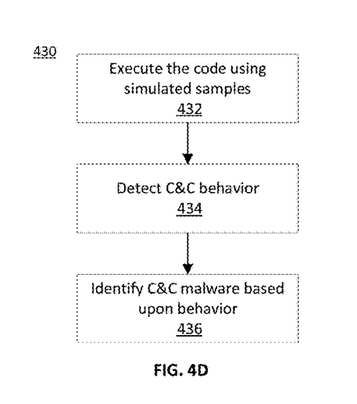
FIG. 4D is a flow diagram of a method for providing the dynamic analysis of FIG. 4A, in accordance with some embodiments.

Referring back to FIG. 4A, in some embodiments, the method may include conducting dynamic analysis to detect C&C malware in an action 430. For example, as shown in FIG. 4D, the method for providing the dynamic analysis of FIG. 4A, in accordance with some embodiments, may include executing the code using simulated samples in an action 432. The code may be executed in a testing environment by simulating a sample. Further, the method may include detecting behavior related to C&C malware in an action 434. A debugger, function call tracer, machine emulator, logic analyzer, or network sniffer may be used to perform this action in some embodiments. In response to the detected C&C behavior, the method may include identifying C&C malware based upon this behavior in an action 436.

Figure 4E:
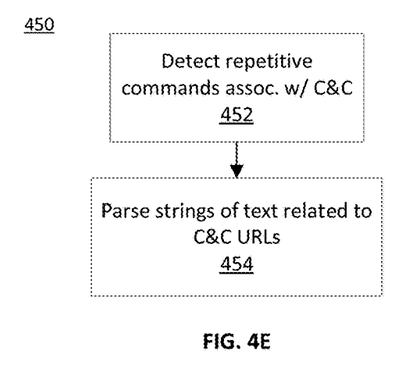
FIG. 4E is a flow diagram of a method for identifying data patterns of FIG. 4A, in accordance with some embodiments.

Further as shown in FIG. 4A, the method may include collecting incoming network and file content in an action 440, where data patterns related to C&C malware are identified in an action 450. For example, as shown in FIG. 4E, the method for identifying data patterns of FIG. 4A, in accordance with some embodiments, may include detecting repetitive commands associated with C&C malware, such as commands from C&C servers or commands that set or change C&C URLs (in action 452). For example, repetitive commands or data patterns may include, but are not limited to, "http://," "INSTALL_URL," "result code," or "SHORTCUT_INSTALLED." Further, the method may include parsing strings of text related to C&C URLs in an action 454.

Figure 4F:
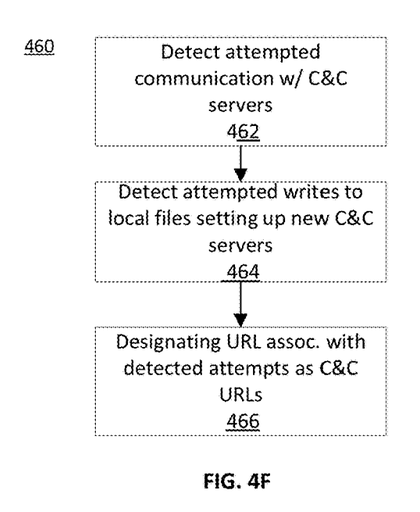
FIG. 4F is a flow diagram of a method for identifying C&C URLs of FIG. 4A, in accordance with some embodiments.

Still referring to FIG. 4A, in an action 460, the method may include identifying C&C URLs using the identified data patterns of action 450. For example, as shown in FIG. 4F, the method for identifying C&C URLs of FIG. 4A, in accordance with some embodiments, may include detecting and attempted communication with a C&C server by the application in an action 462. In an action 464, the method may include detecting attempted writes by the application to local files with the intent of setting up new C&C servers. As a result, in an action 466, the method may include designating the URL associated with the detected attempts as a C&C URL.

Figure 4G:
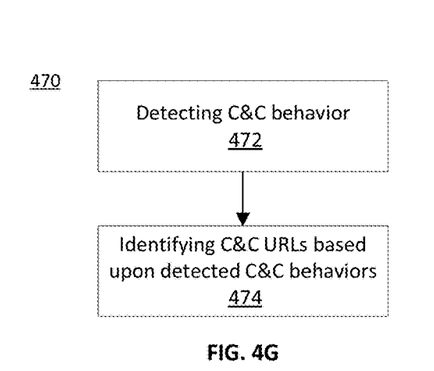
FIG. 4G is a flow diagram of a method for filtering C&C URLs of FIG. 4A, in accordance with some embodiments.

Continuing with FIG. 4A, in an action 470, the method may include filtering the detected C&C URLs further based upon any detected C&C behaviors. For example, as shown in FIG. 4G, the method for filtering C&C URLs of FIG. 4A, in accordance with some embodiments, may include detecting C&C behavior, such as intercepting an incoming SMS message, executing an abortBroadcast, sending an SMS text through a network, utilizing a text premium SMS, and initiating collection of data leaked through to the network or the SMS and the like in an action 472. The collection of private information may include the collection of phone numbers, package names, device identifiers (IDs), International Mobile Station Equipment Identities (IMEIs), SMS messages, and the like. Further, the method may include identifying C&C URLs based upon these detected C&C behaviors in an action 474.

Using the dynamic C&C URL detection process described above, an example of inspecting network contents and file contents to detect C&C URLs is provided. In a first example, the antivirus system provided herein may collect file contents from the path: "file:/data/data/[app package]/shared_prefs/," as shown below.

```
<?xml version='1.0' encoding='utf-8' standalone='yes' ?>
<map>
<int name="KEY_NOTIFICATIONS_COUNT" value="3" />
<string name="NET_OP">25001</string>
<boolean name="WAS_INSTALLED" value="true" />
<boolean name="SHORTCUT_INSTALLED" value="true" />
<string name="KEY_MSG_TEXT">9724+43+p+a+2ed3b7dd</string>
<string name="URL">http://gooogle-o.com/promt1.apk</string>
<string name="IS_SENT_KEY">SENT_IS_NOT_OK</string>
<string name="INSTALLED_URL">
http://gooogle-o.com/promt1.apk</string>
</map>
```

Further, the system may parse the file, detecting particular patterns associated with C&C URLs. For example, the system may grep "*http://*", to find patterns within the file. The resultant for this example would be:

```
<string name="URL">http://gooogle-o.com/promt1.apk</string>
<string name="INSTALLED_URL">
http://gooogle-o.com/promt1.apk</string>
```

The system may also parse the file for instructions relating to URLs. For example, the system may search for 'INSTALLED_URL">\Khttp:[^<]+'. Additionally, the system may collect URLs from the file contents as potential candidates for C&C URLs. In this example, the following URLs were collected:

```
http://4my-android.ru
http://allwebfile.info
http://androfiles.com
http://androfon.com
http://android-my.ru
http://android-save.com
http://androidupd8.net
http://android-warez.ru
http://andstore.ru
http://apkshka.com
http://eternitywarriors2.ru
http://filemib.info
http://google-dowloads.com
http://gooogle-o.com
http://hereallinformation.com
http://higalaxy.ru
http://market.android.com.ensomove.com
http://mobi-service9.com
http://new-androids-play.com
http://on-android.ru
http://programs-android.ru
http://wap.pux.su
http://www.android-app.ru
```

The system can further evaluate suspicious behavior from the detection results using dynamic analysis; wherein, the system detects when an SMS is sent and packages that are relevant to C&C malware samples are leaked. In evaluating the detected URLs, the system may query how many malware, Potentially Unwanted Applications (PUA), and good samples connected to the URLs exists from the detection results of the dynamic analysis. A final decision can be made by the system using a predetermined limit, decision algorithm, or policy.

| Candidates | #malware | #pua | #good samples | decision |
|---|---|---|---|---|
| http://4my-android.ru | 4853 | 45 | 0 | C & C |
| http://allwebfile.info | 898 | 6 | 0 | C & C |

| Candidates | #malware | #pua | #good samples | decision |
|---|---|---|---|---|
| http://androfiles.com | 625 | 2 | 0 | C & C |
| http://androfon.com | 760 | 1 | 0 | C & C |
| http://android-my.ru | 6759 | 21 | 0 | C & C |
| http://android-save.com | 48 | 2 | 0 | C & C |
| http://androidupd8.net | 57 | 0 | 0 | C & C |
| http://android-warez.ru | 366 | 4 | 0 | C & C |
| http://andstore.ru | 25756 | 129 | 0 | C & C |
| http://apkshka.com | 2366 | 13 | 0 | C & C |
| http://eternitywarriors2.ru | 85 | 0 | 0 | C & C |
| http://filemib.info | 322 | 1 | 0 | C & C |
| http://google-dowloads.com | 209 | 1 | 0 | C & C |
| http://gooogle-o.com | 146 | 0 | 0 | C & C |
| http://hereallinformation.com | 220 | 3 | 0 | C & C |
| http://higalaxy.ru | 1519 | 4 | 0 | C & C |
| http://market.android.com.ensomove.com | 8510 | 60 | 0 | C & C |
| http://mobi-service9.com | 2137 | 28 | 2 | NO |
| http://new-androids-play.com | 1076 | 10 | 0 | C & C |
| http://on-android.ru | 939 | 3 | 0 | C & C |
| http://programs-android.ru | 705 | 7 | 0 | C & C |
| http://wap.pux.su | 70 | 0 | 0 | C & C |
| http://www.android-app.ru | 7858 | 43 | 0 | C & C |

In this example, as shown, all but one C&C URL is refined and verified as C&C malware. In particular, the URL, http://mobi-service9.com, aligns with 2137 malware types and 28 PUA; however the URL also aligns with two good samples. As a result, the system designates that the URL is not to be associated with C&C malware.

In a second example, given a small set of samples incoming network contents may be collected and analyzed for repeated data. As shown in the table below, the pattern, "{response:[*], status: ok}" may be detected.

```
{response: [ ],status: ok}
(response: [{bot_id: 398, bot_pwd: 8vz6c}],status: ok}
(response: [{mode: set_intercept,intercept: all}],status: ok}
{response: [ ],status: 13101}
{response: [ ],status: 22069}
(response: [{bot_id: 1114, bot_pwd: qsubp}],status: ok}
{response: [ ],status: 19717}
(response: [{bot_id: 394, bot_pwd: 91u3b}],status: ok}
(response: [(bot_id: -1}],status: ok}
(response: [{bot_id: 319, bot_pwd: 9bph9}],status: ok}
{response: [ ],status: 17514}
{response: [ ],status: 15970}
{response: [ ],status: 9186}
(response: [{bot_id: 331}],status: ok}
<b>Oww6Ka nopKnioLieHima K 6a3e paHHbix.</b>
{response: [ ],status: ok}
```

During simulation of the android apps, the system described herein detects suspicious URLs, that access network contents using the predefined pattern above and have different domain names. For this example, the URLs are shown in the table below:

```
http://abeiyy8.com/controller.php
http://xxx888xxx.eu/controller.php
http://fontgon.com/controller.php
http://nestyrevs.me/controller.php
http://awerrfc.com/controller.php
http://dhyecbk.com/controller.php
http://abneuu1.com/controller.php
http://feziphoto.com/controller.php
http://woo.tinysound.net/controller.php
http://ykjvvjf.com/controller.php
```

```
http://qsxdecr12.com/controller.php
httb://bot1.assiqn.aux.su/controller.php
```

In a third example, the system analyzes the following network contents: 1b||{"ok":0,"result_code":2000}. The pattern detected by the system is: {ok:\d+, result code:\d+}. Additional suspicious URLs are found by the system as shown in the table below:

```
http://my.zhxone.com/service.php?api=install
http://115.28.52.43:9000/tabscr/sdk/appclient/fetch.do
http://115.28.52.43:8080/pay/appclient/fetchTask.do
```

In another example, the system analyzes file contents, as shown below:

```
<?xml version='1.0' encoding='utf-8' standalone='yes' ?>
<map>
<int name="KEY_NOTIFICATIONS_COUNT" value="3" />
<string name="NET_OP">25001</string>
<boolean name="SUBID_RECEIVED_KEY" value="false" />
<boolean name="FIRST_MTS_SEND_10" value="true" />
<boolean name="KEY_WAS_OPENED" value="false" />
<boolean name="SHORTCUT_INSTALLED" value="true" />
<string name="KEY_MSG_TEXT">1682+370371+x+a+b2d0531d</string>
<string name="URL">
http:/www.android-touch.ru/engine/download.php?id=895</string>
<string name="IS_SENT_KEY">NOT_SENT_OK</string>
</map>
```

The pattern the system found is as follows: ".*KEY_WAS_OPENED.*SHORTCUT_INSTALLED.*IS_SENT_KEY.*" As a result, additional suspicious URLs were detected by the system, as shown in the table below:

```
http://4pda.ru
http://androfiles.com
http://androidgoodcool.ru
http://androidgoogood.ru
http://androidklas.ru
http://androiddownloadbest.ru
http://android-readers.net
http://androidruuuss.ru
http://clubwikiconbca.ru
http://dl.ipcsuite.com
http://fruitninja-mobile.ru
http://hereallinformation.com
http://igry-for-android.net
http://mobi-bro.net
http://mobi-service2.com
http://mobi-service9.com
http://pipison.info
http://playmarketgoogle.ru
http://play-marketu.ru
http://redandroid.net
http://rghost.ru
http://themedroid.net
http://topapk.ru
http://urgent-update.net
http://wapru.info
http://www.android-touch.ru
```

It should be appreciated that the methods described herein may be performed with a digital processing system, such as a conventional, general-purpose computer system. Special purpose computers, which are designed or programmed to perform only one function may be used in the alternative.

Figure 5:
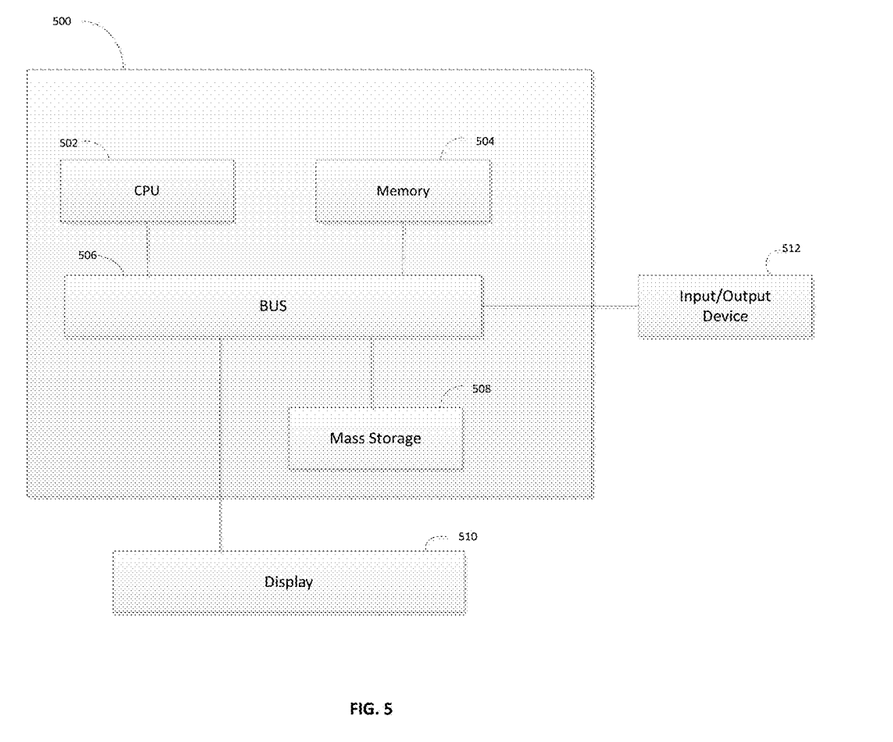
FIG. 5 is an illustration showing an exemplary computing device which may implement the embodiments described herein.

FIG. 5 is an illustration showing an exemplary computing device which may implement the embodiments described herein. The computing device of FIG. 5 may be used to perform embodiments of the functionality for performing C&C malware detection in accordance with some embodiments. The computing device includes a central processing unit (CPU) 502, which is coupled through a bus 506 to a memory 504, and mass storage device 508. Mass storage device 508 represents a persistent data storage device such as a floppy disc drive or a fixed disc drive, which may be local or remote in some embodiments. The mass storage device 508 could implement a backup storage, in some embodiments. Memory 504 may include read only memory, random access memory, etc. Applications resident on the computing device may be stored on or accessed through a computer readable medium such as memory 504 or mass storage device 508 in some embodiments. Applications may also be in the form of modulated electronic signals modulated accessed through a network modem or other network interface of the computing device. It should be appreciated that CPU 502 may be embodied in a general-purpose processor, a special purpose processor, or a specially programmed logic device in some embodiments.

Display 512 is in communication with CPU 502, memory 504, and mass storage device 508, through bus 506. Display 512 is configured to display any visualization tools or reports associated with the system described herein. Input/output device 510 is coupled to bus 506 in order to communicate information in command selections to CPU 502. It should be appreciated that data to and from external devices may be communicated through the input/output device 510. CPU 502 can be defined to execute the functionality described herein to enable the functionality described with reference to FIGS. 1-4G. The code embodying this functionality may be stored within memory 504 or mass storage device 608 for execution by a processor such as CPU 502 in some embodiments. The operating system on the computing device may be iOS™, MS-WINDOWS™, OS/2™, UNIX™, LINUX™, or other known operating systems. It should be appreciated that the embodiments described herein may be integrated with virtualized computing system also.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "I" symbol includes any and all combinations of one or more of the associated listed items. As used herein, the singular forms "a", "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved. With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, flash memory devices, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to so connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware; for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of detecting command and control (C&C) malware and protecting one or more computing devices against the malware, the method comprising:
    hooking an Application Programming Interface (API) within an application;
    analyzing code of the hooked API using static analysis to detect malware associated with a C&C server;
    conducting dynamic analysis on the code by executing the code within a testing environment and collecting incoming network and file content;
    identifying behaviors and data patterns related to the malware from the incoming network and file content, the data patterns including repetitive commands associated with the C&C server to set or change C&C Uniform Resource Locators (URLs);
    identifying the URLs associated with the C&C server based upon the identified data patterns, wherein the URLs are identified by detecting code attempts to communicate with the C&C server by the application within the testing environment;
    filtering the URLs based upon the behaviors of the C&C server found during the dynamic analysis;
    designating the filtered URLs as associated with malware; and
    denying the one or more computing devices access to the filtered URLs based on the designation that the filtered URLs are associated with malware.

2. The method of claim 1, wherein the hooking comprises:
    detecting the API associated with HTTP GET/POST, File Input/Output (I/O), private information collection, or outputting data; and
    injecting instructions into the detected API to cause execution of alternate code.

3. The method of claim 1, wherein the analyzing code comprises:
    disassembling the code; and
    detecting C&C malware from the disassembled code.

4. The method of claim 1, wherein the conducting dynamic analysis further comprises:
    executing the code within a testing environment by simulating a sample; and
    detecting behavior of the C&C server using one of a debugger, function call tracer, machine emulator, logic analyzer, or network sniffer.

5. The method of claim 1, wherein the repetitive commands associated with the C&C server to set or change C&C URLs include at least one of "http://," "INSTALL URL," "result code," and "SHORTCUT INSTALLED".

6. The method of claim 1, wherein the identifying the URLs further comprises:
    detecting when the code attempts to write to local files setting up new C&C servers; and identifying, in response to the attempted write, additional URLs associated with the C&C server.

7. The method of claim 1, wherein the filtering the URLs comprises:

detecting when one of the URLs performs at least one of the actions including, intercepting an incoming Short Message Service (SMS) message, executing an abortBroadcast, sending an SMS text through a network, utilizing a text premium SMS, and initiating collection of data leaked through to the network or the SMS.

8. A system for detecting malware and protecting one or more computing devices against the malware, the system comprising:

a memory storing programmed instructions; and a processor configured to execute the programmed instructions to:

hook an Application Programming Interface (API) within an application;

analyze code of the hooked API using static analysis to detect malware associated with a command and control (C&C) server;

conduct dynamic analysis on the code by executing the code within a testing environment and collecting incoming network and file content;

identify behaviors and data patterns related to the malware from the incoming network and file content, the data patterns including repetitive commands associated with the C&C server to set or change C&C Uniform Resource Locators (URLs);

identify the URLs associated with the C&C server based upon the identified data patterns, wherein the URLs are identified by detecting code attempts to communicate with the C&C server by the application within the testing environment;

filter the URLs based upon the behaviors of the C&C server found during the dynamic analysis;

designate the filtered URLs as associated with malware, and deny the one or more computing devices access to the filtered URLs based on the designation that the filtered URLs are associated with malware.

9. The system of claim 8, wherein the processor, for hooking the API, is configured to execute the programmed instructions to:

detect the API associated with HTTP GET/POST, File I/O, private information collection, or outputting data; and inject instructions into the detected API to cause execution of alternate code.

10. The system of claim 8, wherein the processor, for analyzing the code, is configured to execute the programmed instructions to:

disassemble the code; and detect C&C malware from the disassembled code.

11. The system of claim 8, wherein the processor, for conducting dynamic analysis, is further configured to execute the programmed instructions to:

execute the code within a testing environment by simulating a sample; and detect C&C behavior through one of a debugger, function call tracer, machine emulator, logic analyzer, or network sniffer.

12. The system of claim 8, wherein the repetitive commands associated with the C&C server to set or change C&C URLs include at least one of "http://," "INSTALL URL," "result code," and "SHORTCUT INSTALLED".

13. The system of claim 8, wherein the processor, for identifying the URLs, is further configured to execute the programmed instructions to:

detect when the code attempts to write to local files setting up new C&C servers; and identify, in response to the attempted write, additional URLs associated with the C&C server.

14. The system of claim 8, wherein the processor, for filtering the URLs, is configured to execute the programmed instructions to:

detect when one of the C&C URLs performs at least one of the actions including, intercepting an incoming SMS message, executing an abortBroadcast, sending an SMS text through a network, utilizing a text premium SMS, and initiating collection of data leaked through to the network or the SMS.

15. A non-transitory computer-readable medium including code for performing a method for detecting malware and protecting a computing device against the malware, the method comprising:

hooking an Application Programming Interface (API) within an application;

analyzing code of the hooked API using static analysis to detect malware associated with a command and control (C&C) server;

conducting dynamic analysis on the code by executing the code within a testing environment and collecting incoming network and file content;

identifying behaviors and data patterns related to the malware from the incoming network and file content, the data patterns including repetitive commands associated with the C&C server to set or change C&C Uniform Resource Locators (URLs);

identifying the URLs associated with the C&C server based upon the identified data patterns, wherein the URLs are identified by detecting code attempts to communicate with the C&C server by the application within the testing environment;

filtering the URLs based upon the behaviors of the C&C server found during the dynamic analysis;

designating the filtered URLs as associated with malware, and denying the computing device access to the filtered URLs based on the designation that the filtered URLs are associated with malware.

16. The computer-readable medium of claim 15, wherein the hooking comprises:

detecting the API associated with one of HTTP GET/POST, File I/O, private information collection, or outputting data; and injecting instructions into the detected API to cause execution of alternate code.

17. The computer-readable medium of claim 15, wherein the repetitive commands associated with the C&C server to set or change C&C URLs include at least one of "http://," "INSTALL URL," "result code," and "SHORTCUT INSTALLED".

18. The computer-readable medium of claim 15, wherein the conducting dynamic analysis further comprises:

executing the code within a testing environment by simulating a sample; and detecting behavior of the C&C server through one of a debugger, function call tracer, machine emulator, logic analyzer, or network sniffer.

19. The computer-readable medium of claim 15, wherein the identifying the URLs further comprises:

detecting when the code attempts to write to local files setting up new C&C servers; and identifying, in response to the attempted write, additional URLs associated with the C&C server.

20. The computer-readable medium of claim 15, wherein the filtering the URLs comprises:

detecting when one of the URLs performs at least one of the actions including, intercepting an incoming SMS message, executing an abortBroadcast, sending an SMS text through a network, utilizing a text premium SMS, and initiating collection of data leaked through to the network or the SMS.

* * * * *